United States Patent [19]

Wright

[11] 4,412,465
[45] Nov. 1, 1983

[54] TOOL COMPENSATOR

[75] Inventor: Lawrence B. Wright, Berkley, Mich.

[73] Assignee: Lamb Technicon Corp., Warren, Mich.

[21] Appl. No.: 328,205

[22] Filed: Dec. 7, 1981

[51] Int. Cl.³ .................. B23B 49/00; B23B 47/18
[52] U.S. Cl. ........................... 82/1.2; 82/21 A; 82/2 B; 408/12; 408/13; 408/130
[58] Field of Search ............. 82/2 B, 1.2, 1.4, 21 A; 408/10, 11, 12, 13, 130; 409/148, 150, 152; 51/165, 87; 60/581, 567; 92/60.5, 13.6

[56] References Cited

U.S. PATENT DOCUMENTS

| | | | |
|---|---|---|---|
| 1,997,476 | 4/1935 | Wallene | 92/60.5 |
| 3,293,960 | 12/1966 | Feldwisch | 82/2 R |
| 3,563,133 | 2/1971 | Asman | 409/133 |
| 3,641,849 | 2/1972 | Kinney | 82/1 R |
| 3,672,246 | 6/1972 | Prewett | 82/2 B |
| 3,740,161 | 6/1973 | Milewski | 408/12 |
| 3,754,487 | 8/1973 | Nachtigal | 82/1 C |
| 3,935,766 | 2/1976 | Masters | 82/21 A |
| 3,945,297 | 3/1976 | Hohberger | 82/2 B |
| 4,038,890 | 8/1977 | Winget | 82/5 |
| 4,089,172 | 5/1978 | Junttila | 60/567 |
| 4,096,770 | 6/1978 | Tanner | 82/2 B |
| 4,100,826 | 7/1978 | Takahashi | 82/2 B |
| 4,139,969 | 2/1979 | Brown | 51/165.87 |
| 4,159,660 | 7/1979 | Buckley | 83/3 |
| 4,169,405 | 10/1979 | Tsunemoto | 92/13.6 |

FOREIGN PATENT DOCUMENTS

WO79/573 8/1979 PCT Int'l Appl. .......... 92/13.6

*Primary Examiner*—Leonidas Vlachos
*Assistant Examiner*—Jerry Kearns
*Attorney, Agent, or Firm*—Barnes, Kisselle, Raisch, Choate, Whittemore & Hulbert

[57] ABSTRACT

A cutting tool is operatively connected with the piston of a tool positioning cylinder so as to move in response to axial movement of the piston. One end of the cylinder is connected with one end of a stroke limiting cylinder to form a closed fluid circuit therebetween. The piston of the stroke limiting cylinder has a predetermined adjustable stroke. A metering system is provided for injecting or extracting incremental fixed volumes of oil to and from the closed fluid circuit to increase or decrease the stroke of the piston in the tool positioning cylinder and thereby vary the depth of cut of the tool.

14 Claims, 3 Drawing Figures

TOOL COMPENSATOR

This invention relates to a tool compensator and, more particularly, to a hydraulic tool compensator for automatically adjusting a cutting tool that for various reasons is not producing the desired dimension on a workpiece.

In modern manufacturing systems the ultimate objective is to produce quality workpieces without interruption. The main goal is productivity which is self-defeating if, at the same time, quality is not achieved. In transfer machines where workpieces are indexed through successive stations at which machining operations are performed it is common practice to locate gaging stations following a precision machining station. The gaging station determines the dimension machined at the previous station and, if the dimension is approaching an out-of-tolerance condition, an appropriate signal is relayed to the previous machining station and the tool is compensated in the proper direction to insure that the next successive workpiece will be machined to a dimension nearer to the mean of the specified tolerance.

Prior art mechanisms for performing this tool compensation have mainly been of three types; namely, stepping motors; timed motors and hydraulic pressure. All of these systems have shortcomings which are overcome by the present invention. The problems involved in the use of stepping motors are highlighted by the necessity of a direct current power supply, the time required to make the many steps, the necessity of an encoder and a counter to monitor the number of steps, and the controls required to manage all of these mechanisms. When a motor is used to power a compensator and its running time is controlled to determine the magnitude of compensation, several undesirable phenomena are encountered. A change in friction caused by lack of lubricant and a change in temperature will affect the amount of compensation for any given time. The inability to utilize a feed-back system to determine the magnitude of compensation provided by the timed motor also renders this type of system unreliable. Hydraulic pressure systems normally use a high hydraulic pressure to deform a beam spring that supports the cutting tool. The plot of force verses deflection of most materials is a straight curve and, therefore, if the pressure is known, the deflection and the tool position are readily determinable. However, variable and exact hydraulic pressures are difficult to generate. Furthermore, it is extremely easy to deflect the beam spring beyond its elastic limit, in which case the tool position can no longer be determined by the force-deflection curve. Likewise, the controls required to generate a variable, high hydraulic pressure are complex, unreliable and expensive.

As distinguished from the prior art, the present invention utilizes the principle of hydraulic displacement to change the location of a cutting tool. The location of the cutting tool through magnifying devices is determined by the displacement of a piston by a substantially incompressible fluid in a hydraulic cylinder. When the tool is to be displaced in one direction a small predetermined amount of additional oil is injected into the cylinder. To displace the tool in the opposite direction a small amount of oil is extracted from the cylinder. The invention also contemplates a means for sensing and visually indicating, preferably on a scale, the precise location of the tool. This not only allows observation during normal operation, but also provides a means for positioning a new tool in a tool holder after a tool change.

The primary object of this invention is to provide an arrangement to compensate a cutting tool of a metal cutting machine that utilizes the principle of hydraulic displacement.

A further object of the invention is provide a tool compensating arrangement that is designed to supply an electric signal that is indicative of the tool position.

Another object of the invention is to provide a tool compensating arrangement that can be operated by a simple control system.

Other objects, features and advantages of the present invention will become apparent from the following description and accompanying drawing, in which.

Figure 1:
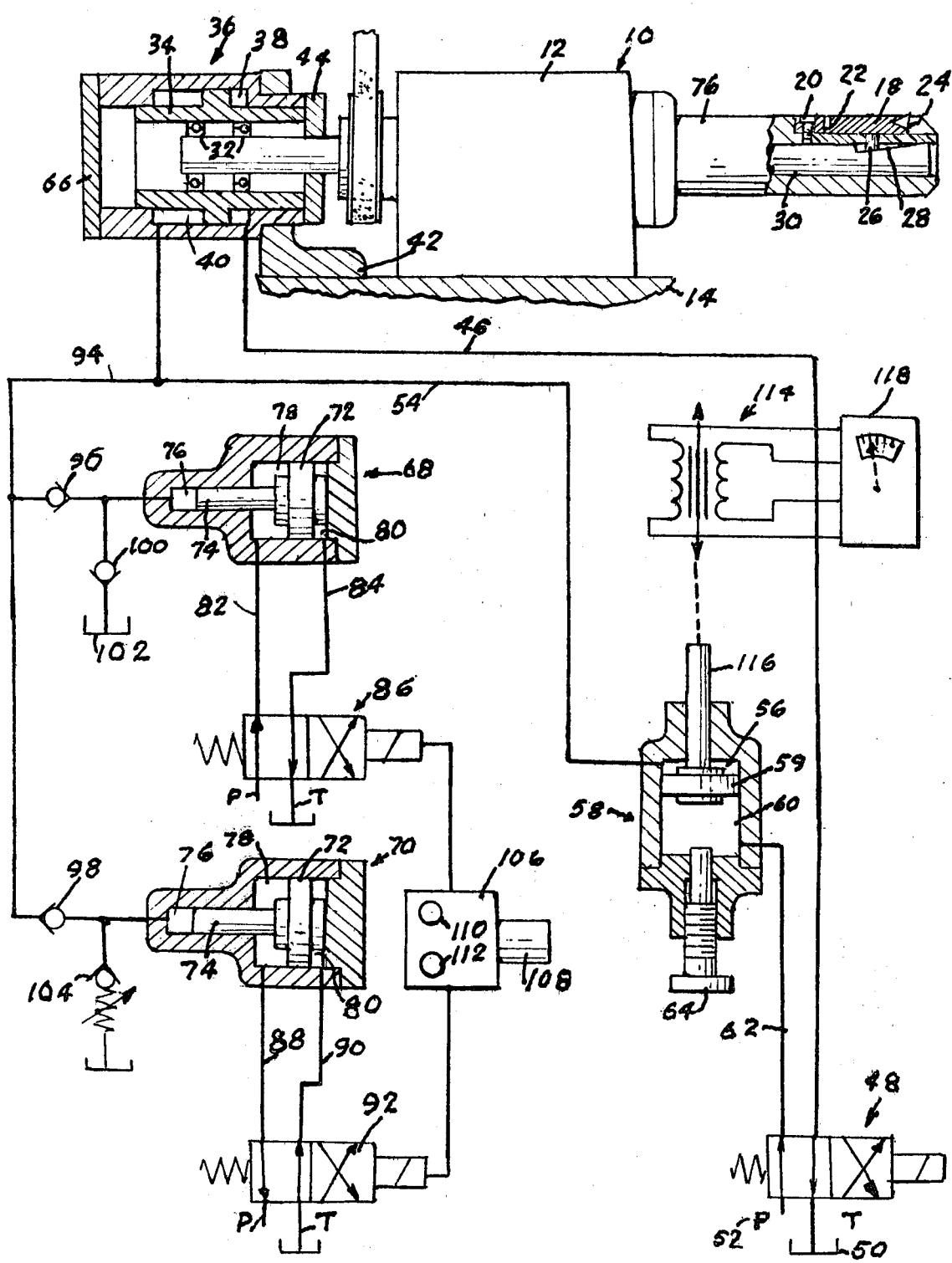
FIG. 1 is a diagrammatic view of a boring machine spindle provided with a compensation and its controls according to the present invention.

In FIG. 1 there is illustrated a boring machine, generally designated 10, having a spindle 12 mounted on a base 14. Spindle 12 includes a rotationally supported boring bar 16 on which a cutting tool 18 is supported by means of a screw 20. Tool 18 is notched as at 22 so that the portion of the tool on which the cutting tool insert 24 is seated can be deflected by radial movement of the spacer 26 extending between the cutting tool and the wedge surface 28 of a drawbar 30. Drawbar 30 is arranged for axial sliding movement within boring bar 16 and, at the rear end thereof, the drawbar is connected as by bearings 32 with a piston 34 slideably arranged within a tool positioning cylinder 36. Piston 34 divides cylinder 36 into a pressure chamber 38 and a control chamber 40. Cylinder 36 is fixedly supported on base 14 by a bracket 42. With the above-described arrangement, when piston 34 is shifted to the right as viewed in FIG. 1 so that it abuts against end plate 44, the tool 18 is retracted to its radially innermost position. As piston 34 is shifted progressively to the left, the cutting tool 18 is progressively displaced radially outwardly.

Pressure chamber 38 of cylinder 36 is connected by a conduit 46 with one control port of a two-position, four-way valve 48 which is solenoid actuated with a spring return. When the solenoid is de-energized conduit 46 is connected to tank as at 50 and when the solenoid is energized conduit 46 is connected through the valve to a source of pressurized hydraulic fluid as at 52.

Control chamber 40 of cylinder 36 is connected by a conduit 54 with the control chamber 56 of a stroke limiter cylinder 58. A piston 59 in cylinder 58 divides the cylinder into the control chamber 56 and a pressure chamber 60. Pressure chamber 60 is connected by a conduit 62 with the other control port of valve 48. An adjusting screw 64 on cylinder 58 limits the extent to which piston 59 can be displaced in one direction and thereby determines the maximum volume of control chamber 56. When the solenoid of valve 48 is de-energized chamber 60 is connected to the pressure source at 52 and when the solenoid is energized chamber 60 is connected to tank at 50.

With the above-described arrangement it will be apparent that conduit 54 defines a closed fluid circuit between control chamber 40 of cylinder 36 and control chamber 56 of cylinder 58. Thus, when the solenoid of valve 48 is de-energized, chamber 60 of cylinder 58 is pressurized to displace piston 59 upwardly to the position shown in FIG. 1 and the substantially incompressible hydraulic fluid (oil) in chamber 56 is directed through conduit 54 into chamber 40 of cylinder 36 to thus displace piston 34 to the right wherein it abuts end plate 44. With the components in the positions illustrated in FIG. 1, when the solenoid of valve 48 is energized, pressure fluid is directed through conduit 46 to chamber 38 of cylinder 36 to thereby displace piston 34 to the left. This causes hydraulic fluid to be discharged from control chamber 40 through conduit 54, into chamber 56 of cylinder 58. The relative displacements of chambers 40,56 are such that piston 59 abuts screw 64 before piston 34 abuts end plate 66. In other words, the maximum displaceable volume of chamber 40 is greater than the maximum displaceable volume of chamber 56.

The maximum displaceable volume of chamber 56 can be varied by adjusting screw 64 which in turn determines the radially outermost position of cutting tool insert 24. Thus, when chamber 38 is pressurized, if screw 64 is rotated to slightly enlarge chamber 56, piston 34 will shift further to the left a slight extent and thus cause drawbar 30 to displace insert 24 radially outwardly. In like manner, if screw 64 is rotated in the opposite direction, the effective volume of chamber 56 is reduced and the effective volume of the chamber 40 is increased so that, when chamber 38 is pressurized, the stroke of piston 34 will be less and insert 24 will be located radially inwardly from its previous setting.

In order to incrementally vary the radial position of insert 24 between successive machining operations an oil-injecting cylinder 68 and an oil-extracting cylinder 70 are provided. Within each of these cylinders there is arranged a piston 72 having a plunger 74 projecting from one side thereof and slideable in sealed relation in a bore which defines a metering chamber 76. The diameter of each plunger 74 is substantially smaller than the diameter of piston 72 so that the pressure generated in metering chambers 76 is substantially greater than the pressure developed in the chambers 78,80 on the opposite sides of the pistons 72 in cylinders 68,70. Chambers 78,80 of cylinder 68 communicate by means of conduits 82,84 with the two control ports of a two-position, four-way, solenoid-operated valve 86. Chambers 78,80 of cylinder 70 communicate by means of conduits 88,90 with the two control ports of a two-position, four-way, solenoid-operated valve 92.

A branch conduit 94 connects with conduit 54 which establishes the closed fluid circuit between the control chamber 40 of cylinder 36 and the control chamber 56 of cylinder 58. Branch conduit 94 communicates with metering chamber 76 of injection cylinder 68 through a one-way check valve 96 and with the metering chamber 76 of extraction cylinder 70 through a one-way check valve 98. Check valve 96 prevents the flow of fluid from branch conduit 94 into metering chamber 76 of injection cylinder 68 and check valve 98 prevents the flow of fluid from metering chamber 76 of extraction cylinder 70 into branch conduit 94. Metering chamber 76 of cylinder 68 is connected by a one-way check valve 100 with a fluid supply reservoir 102 and metering chamber 76 of cylinder 70 is connected to tank through a pressure relief valve 104. Valve 104, which is preferably a spring-biased relief valve, is set to open at a pressure substantially higher than that generated at the pressure ports of the several solenoid-operated valves.

The solenoids of valves 86,92 are preferably energized by a workpiece gaging mechanism 106 having a bore gaging head 108. When the workpiece gaged has a bore which is approaching the high side of the tolerance range, gaging mechanism 106 will momentarily energize the solenoid of valve 86 and, when the dimension of the bore gaged is approaching the low side of the tolerance range, gaging mechanism 106 will energize the solenoid of valve 92. Preferably the solenoids of these two cylinders are also adapted to be manually energized by push buttons 110,112, respectively.

During each machining operation the solenoids of valves 86,92 are de-energized so that the chambers 78 of these cylinders are pressurized and maintain the plungers 74 in the retracted position illustrated in FIG. 1, the metering chambers 76 at this time being filled with oil. At the same time, the solenoid of valve 48 is energized so that pump pressure is applied through conduit 46 to the pressure chamber 38 of cylinder 36 which causes the cutting tool to assume the radial position determined by the adjustment of screw 64. After a machining operation is completed, the solenoid of valve 48 is de-energized so that pump pressure is applied to chamber 60 of cylinder 58 and chamber 38 of cylinder 36 is connected to tank. The pistons of cylinders 36,58 therefore assume the positions illustrated in FIG. 1 and the cutting tool is fully retracted so that when the boring bar 16 is withdrawn from the machined bore it will not produce any tool marks on the finished bore.

The dimension of the machined bore is then gaged by the gaging mechanism 106. If the dimension of the machined bore is approaching the high side of the specified tolerance, gaging mechanism 106 will energize the solenoid of valve 86. Thus, chamber 80 of cylinder 68 will be connected to the pressure source and the piston 72 therein will be displaced to the left, the hydraulic fluid in chamber 78 being discharged to tank. The fluid in metering chamber 76 of cylinder 68 will be injected by plunger 74 into branch conduit 94, thus increasing the volume of the fluid in the closed fluid circuit by the amount displaced from metering chamber 76. On the next successive machining operation, when the solenoid of valve 48 is again energized, piston 34 will be displaced to the left a lesser extent than in the previous machining operation and, thus, the cutting insert 24 will be positioned radially inwardly slightly from its setting during the previous machining cycle.

On the other hand, if the gaging mechanism 106 determines that the machined bore is approaching the low side of the tolerance, then it will momentarily energize the solenoid of valve 92 and cause plunger 74 to discharge the oil in metering chamber 76 of cylinder 70 to tank through relief valve 104. Thereafter, when the solenoid of valve 92 is de-energized, plunger 74 of extractor cylinder 70 will be retracted and a like volume of fluid will be extracted from branch conduit 94, thus reducing the total volume of oil in the closed fluid circuit between the control chambers of cylinders 36,58. Then, on the next machining cycle, when the solenoid of valve 48 is again energized, since the volume of oil in the closed fluid circuit is less than in the previous machining cycle, piston 34 will be displaced to the left a greater extent and the cutting tool will be located radially outwardly slightly from its position in the previous machining cycle.

Preferably a linear, variable displacement transformer 114, normally referred to as a LVDT, is associated with the rod 116 of the piston 59 in stroke limiter cylinder 58. The LVDT 114 is connected through proper circuitry with a gage 118 having a dial for displaying in a visual way the position of the cutting tool 18 after it is shifted to the cutting position. This feature is particularly useful when replacing a worn tool. As the tool wears, the position of the piston rod 116 will change and will be reflected on the dial gage 118. When a new tool is installed to replace a worn tool, the solenoid of the injector cylinder 68 or the extractor cylinder 70 can be pulsed manually by means of push buttons 110,112 so as to alter the displayed position of the LVDT 114 to a known set point.

Figure 2:
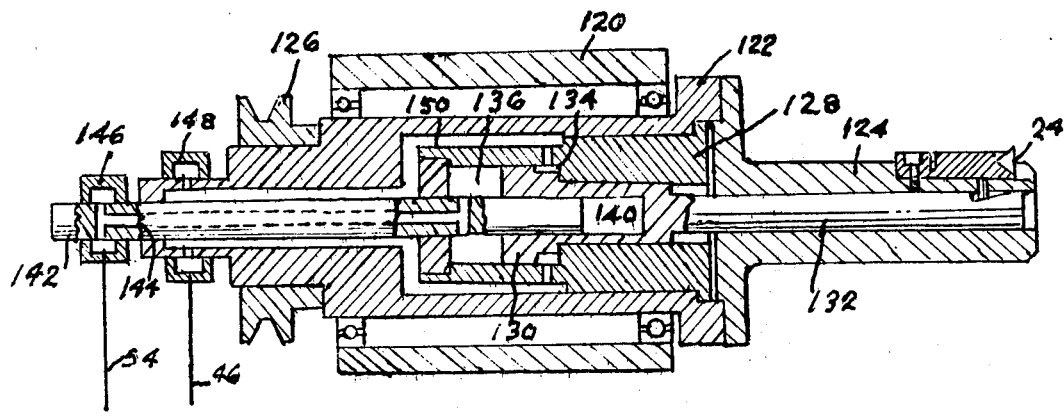
FIG. 2 is a cross sectional view of a machine spindle incorporating the compensator of this invention in a cartridge mounting.

The compensator arrangement shown in FIG. 2 differs from that shown in FIG. 1 only in that its components rotate rather than being rotationally fixed as is the case with piston 34 and cylinder 36 in the arrangement illustrated in FIG. 1. In the arrangement shown in FIG. 2 the spindle housing 120 rotatably supports a hollow shaft 122 which has a boring bar 124 fixedly mounted at one end thereof and having a pulley 126 keyed to the opposite end thereof for providing a rotary drive to the boring bar. Within shaft 122 there is arranged in sealed relation a cylinder 128 in which a piston 130 is arranged for axial sliding movement. Piston 130 is formed integrally with or connected to the drawbar 132 which, when reciprocated, shifts the cutting tool insert 24 radially on the boring bar 124 in the manner previously described. Piston 130 divides cylinder 128 into a pressure chamber 134 and a control chamber 136. Piston 130 is centrally bored as at 140 to slideably receive one end of a cylindrical manifold member 142. Manifold member 142 has a central passageway 144 which, at one end, communicates with control chamber 136 and which, at the other end, communicates with a slip ring union 146. The pressure chamber 134 communicates with a slip ring union 148 through annular passageway 150. The hydraulic circuitry for the arrangement shown in FIG. 2 is identical with that shown in FIG. 1, conduit 54 being connected with union 146 and conduit 46 being connected with union 148.

Figure 3:
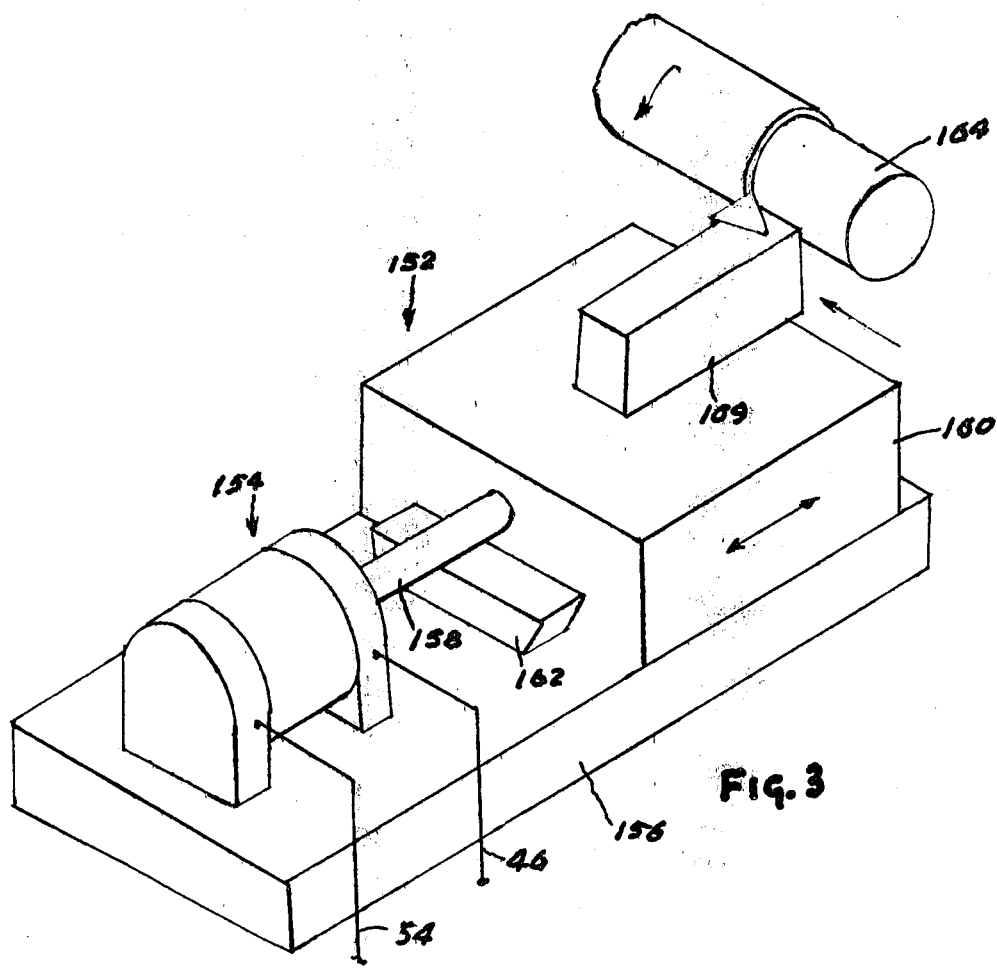
FIG. 3 is a perspective view illustrating the manner in which the compensator of the present invention can be utilized to control the position of the cutting tool of a turning lathe.

FIG. 3 illustrates in a generally diagrammatic way the manner in which the tool compensating circuit shown in FIG. 1 can be utilized to compensate the cutting tool of a workpiece turning machine, such as a lathe, which is generally designated 152. The conduits 54,46 of the hydraulic circuit are connected with the opposite ends of a tool positioning cylinder 154 mounted on the cross slide 156 of the lathe. The piston rod 158 associated with cylinder 154 and having a function similar to that of drawbar 30 in FIG. 1 is fixedly connected to a tool block 160 slideably mounted by a gib 162. The cutting tool 164 is mounted on tool block 160 to machine a rotating workpiece when the lathe carriage (not illustrated) on which cross slide 156 is mounted is caused to traverse the workpiece lengthwise. The finished dimension of the machined workpiece can be accurately controlled by incrementally shifting tool block 160 toward and away from the workpiece 164 in the same manner as described with reference to FIG. 1.

It will be appreciated that the above described technique of changing the finished dimension of a workpiece with small pulses of hydraulic fluid displacement at the command of electrical signals lends itself readily to taper and profile machining. Numerical, computer, processor or like controls can, in such instances, supply the desired signals to generate almost any required profile.

I claim:

1. In a machine tool, a tool compensating device for reciprocating a cutting tool when the dimension of a machined workpiece deviates from a predetermined desired dimension comprising a tool positioning cylinder, having a piston axially displaceable therein and dividing the cylinder into a control chamber and a pressure chamber which vary inversely in size in response to axial displacement of the piston, means operatively connecting the cutting tool and the piston such that the tool moves to increase and decrease its depth of cut in response to displacement of the piston in opposite directions, means for optionally connecting said pressure chamber to a source of pressurized hydraulic fluid for displacing the piston in a direction to decrease the size of the control chamber, a variable volume reservoir having a predetermined maximum volume, a conduit connecting the control chamber with said variable volume reservoir to form a closed fluid circuit so that the volume of hydraulic fluid in the control chamber, the conduit and the reservoir remains constant except when varied by the hereinafter mentioned metering means, the arrangement being such that when the pressure chamber is pressurized the piston is displaced to decrease the size of the control chamber and hydraulic fluid is displaced therefrom, through said conduit and into said reservoir until the reservoir increases in size to its maximum volume and metering means for optionally injecting or extracting predetermined volume increments of hydraulic fluid to and from said closed fluid circuit whereby to vary the extent to which said piston is displaced when said pressure chamber is pressurized.

2. A tool compensating device as called for in claim 1 wherein the piston and cutting tool are connected such that the depth of the cut is increased as the size of the control chamber is decreased.

3. A tool compensating device as called for in claim 1 wherein said metering means comprises an injection chamber and an extraction chamber communicating with said closed fluid circuit, a plunger axially slideable in each chamber to vary the size thereof, each plunger having a fixed stroke, means for optionally reciprocating each of said plungers and means operative in response to reciprocation of the plunger in the ejection chamber to direct a predetermined volume of hydraulic fluid into said closed fluid circuit and to extract a predetermined volume of hydraulic fluid from said closed fluid circuit when the plunger in the extraction chamber is reciprocated.

4. A tool compensating device as called for in claim 3 including a workpiece gaging mechanism for reciprocating one of said plungers when a gaged workpiece is oversize and for reciprocating the other plunger when a gaged workpiece is undersize relative to said predetermined dimension.

5. A tool compensating device as called for in claim 3 wherein said last-mentioned means includes a first unidirectional valve between said injection chamber and said closed fluid circuit and a second, oppositely-acting, unidirectional valve between said extraction chamber and the closed fluid circuit.

6. A tool compensating device as called for in claim 5 including a third unidirectional valve communicating between said injection chamber and a hydraulic fluid supply source, said first and third valves being arranged to discharge fluid from the injection chamber to said closed fluid circuit when the plunger therein is displaced in one direction to reduce the size of the injection chamber and to charge the injection chamber with fluid from said supply source when the plunger is displaced in the opposite direction to increase the size of the injection chamber.

7. A tool compensating device as called for in claim 5 including a fourth unidirectional valve communicating between the extraction chamber and tank, said second and fourth valves being arranged to extract fluid from said closed fluid circuit and fill the extraction chamber when the plunger is displaced in one direction to increase the size of the extraction chamber and to discharge fluid from the extraction chamber to tank when the plunger is displaced in the opposite direction to decrease the size of the extraction chamber.

8. A tool compensating device as called for in claim 1 including means for varying the maximum volume of the variable volume reservoir to thereby vary the extent to which the piston can be displaced in a direction to decrease the size of the pressure chamber.

9. A tool compensating device as called for in claim 1 including a stroke limiting cylinder having a piston axially displaceable therein and dividing the cylinder into a pressure chamber and a control chamber which vary inversely in size in response to axial displacement of the piston, the control chamber of the stroke limiting cylinder comprising said variable volume reservoir.

10. A tool compensating device as called for in claim 9 including means for optionally pressurizing the pressure chamber of the stroke limiting cylinder.

11. A tool compensating device as called for in claim 9 wherein the maximum displaceable volume of the control chamber of the stroke limiting cylinder is less than the maximum displaceable volume of the control chamber of the tool positioning cylinder whereby, when pressure fluid is admitted to the pressure chamber of the tool positioning cylinder, the tool is shifted to a position determined by the maximum volume of the control chamber of the stroke limiting cylinder.

12. A tool compensating device as called for in claim 11 including threaded means of said stroke limiting cylinder positioned to be abutted by the piston therein to vary the maximum volume of the associated control chamber.

13. A tool compensating device as called for in claim 11 including a tool position indicator connected to and movable in response to and proportional to movement of the piston in the stroke limiting cylinder and means for sensing and visually indicating the position of said tool indicator when the piston in the stroke limiting cylinder is displaced to enlarge the control chamber to its maximum volume.

14. A tool compensating device as called for in claim 13 wherein said metering means are manually operable to obtain a predetermined reading on said visual indicating means.

* * * * *

UNITED STATES PATENT AND TRADEMARK OFFICE
CERTIFICATE OF CORRECTION

PATENT NO. : 4,412,465
DATED : November 1, 1983
INVENTOR(S) : Lawrence B. WRIGHT It is certified that error appears in the above–identified patent and that said Letters Patent are hereby corrected as shown below:

Column 6, Line 6   Cancel "reciprocating" and insert in place thereof -- repositioning --

Signed and Sealed this

Third Day of January 1984

[SEAL]

Attest:

GERALD J. MOSSINGHOFF

Attesting Officer     Commissioner of Patents and Trademarks